No. 898,182. PATENTED SEPT. 8, 1908.
J. F. BURNS.
JUNCTION BOX FOR ELECTRICAL CONDUCTORS.
APPLICATION FILED JAN. 17, 1908.
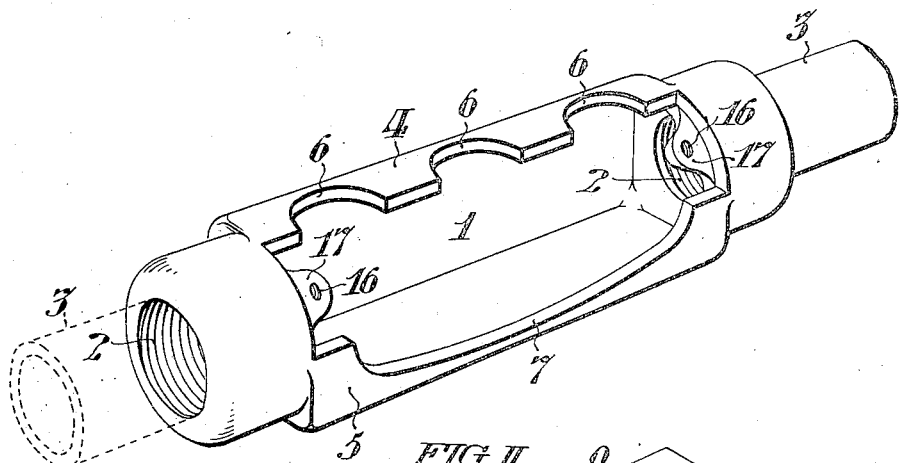
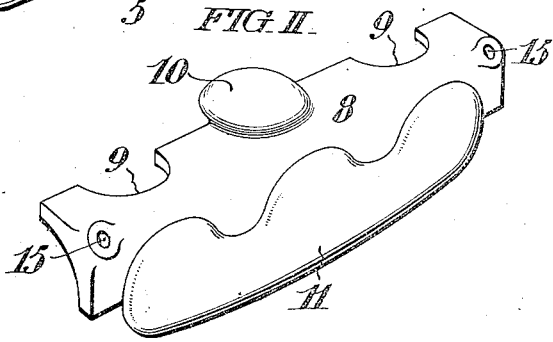
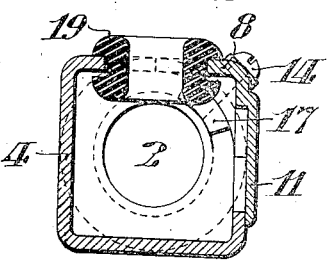
WITNESSES:
Clifton C. Hallowell
Morris L. Jensen
INVENTOR:
JAMES F. BURNS,

UNITED STATES PATENT OFFICE.

JAMES F. BURNS, OF PHILADELPHIA, PENNSYLVANIA.

JUNCTION-BOX FOR ELECTRICAL CONDUCTORS.

No. 898,182.　　　Specification of Letters Patent.　　　Patented Sept. 8, 1908.

Application filed January 17, 1908. Serial No. 411,237.

*To all whom it may concern:*

Be it known that I, JAMES F. BURNS, of Philadelphia, in the State of Pennsylvania, have invented a certain new and useful Improvement in Junction-Boxes for Electrical Conductors, whereof the following is a specification, reference being had to the accompanying drawings.

My improvement is particularly applicable to what are known as outlet boxes, and it is the object thereof to provide a box wherein both the number and the direction of the outlets may be variably determined.

My invention is advantageous in that a single form of box may be employed where several different forms were heretofore required.

As hereinafter described, my invention comprises a box having walls extending in integral relation, in relatively transverse planes, with parallel edges opposed in separated relation, one of said edges being provided with semi-circular outlet recesses, and the other of said edges being provided with a single recess coextensive with said outlet recesses, so as to facilitate access to the interior of the box. A separate removable angle plate is provided coextensive with the space between said recessed wall edges, and adapted to close the same with the exception of the outlet recesses. Detachable means are provided for removably securing said plate on said box, and the latter is so proportioned that its longitudinal side walls are in symmetrical relation with the axis of the conduit with which the box is adapted to be connected, so that said box may be turned upon said axis to selectively present said outlets in different directions without changing the location of said axis.

My invention comprises the various novel features of construction and arrangement hereinafter more definitely specified.

In the drawings; Figure I is a perspective view of a box conveniently embodying my improvement. Fig. II, is a perspective view of a removable plate complementary to the box shown in Fig. I. Fig. III, is a transverse sectional view of said box and plate assembled.

In said figures; the box 1 is provided with two cylindrical inlet openings 2, in its respectively opposite ends, having a common axis coincident with that of the conduit 3, with which the box is connected conveniently by screw threads. The longitudinal side walls 4, and 5 of the box, which extend in relatively transverse planes, respectively parallel with the axis of said openings, are respectively provided with the three semi-circular outlet recesses 6, and with the single recess 7; the latter being coextensive with said three recesses 6. The removable angle plate 8 is coextensive with the space between the recessed edges of said walls 4 and 5, and is provided with the semi-circular outlet recesses 9, and the projection 10, respectively adapted to register with the outlet openings 6, shown in Fig. I. Said recesses 9 are complementary to the end recesses 6 in said box and form therewith circular openings, whose axes extend at right angles with the axis of said inlets 2, and said projection 10 is adapted to cover and close the central recess 6 in said box. Said plate 8 is also provided at its opposite edge with the projection 11, which is adapted to cover and close the recess 7 in the wall 5, of said box. It is to be understood that other detachable plates may be provided to afford either one, two or three outlets when attached to the box shown in Fig. I, and, the plate 8, shown in Fig. II, or any aforesaid modification thereof may be rigidly secured in connection with the box by screws 14, which extend through the apertures 15, at the opposite ends of the plate in screw threaded engagement with the apertures 16, in the lugs 17, at the opposite ends of the box.

Referring to Fig. III, it may be observed that the walls of the box are symmetrically related to the axis of the openings 2, so that without disturbing the location of said axis, which is coincident with the conduit 3, said box may be turned to selectively present its outlets in different directions. The outlet openings in the box are conveniently provided with bushings 19, of porcelain or other insulating material, which fit within the divided openings, formed by the contiguous edges of the box and plate, and afford a continuous smooth margin for contact with the conductors.

I do not desire to limit myself to the precise details of construction and arrangement herein set forth, as it is obvious that various modifications may be made therein without departing from the essential features of my invention, as defined in the appended claims.

I claim:—

1. A junction box comprising a cylindrical inlet; walls extending parallel with the axis of said inlet at right angles to each other, and having recessed edges opposed in parallel relation; a plate having recesses and projections complementary to the recesses in said box walls; and means arranged to detachably secure said plate in said box, substantially as set forth.

2. A junction box having its respectively opposite ends provided with screw threaded openings disposed on a common axis; and side walls extending at right angles to each other, parallel with and in symmetrical relation to said axis, said walls being respectively imperforate and provided with outlets, whereby said box may be turned upon said axis to selectively present said outlets in different directions, substantially as set forth.

3. A junction box comprising a cylindrical inlet and walls, respectively imperforate and provided with outlets, extending at right angles with each other, parallel with and in symmetrical relation to the axis of said inlet, and arranged to be turned upon said axis to selectively present said outlets in different directions, substantially as set forth.

4. A junction box comprising a cylindrical inlet; walls extending at right angles with each other parallel with the axis of said inlet, and having recessed edges; the edge of one wall having a plurality of recesses and the edge of the other wall having a single recess coextensive with said plurality of recesses in the other wall; a plate having recesses complementary to the recesses in one of said walls and a projection complementary to the recess in the other of said walls; and means arranged to detachably secure said plate in said box, substantially as set forth.

5. A junction box having a screw-threaded opening for engagement with a conduit; an axis of rotation coincident therewith, and walls disposed transversely with respect to said axis in rectangular relation, said walls being respectively imperforate and provided with an outlet; whereby, said box may be turned upon said axis to selectively present said outlet in different directions, substantially as set forth.

6. A junction box having a screw-threaded opening for engagement with a conduit; an axis of rotation coincident therewith, and walls disposed transversely with respect to said axis in rectangular relation said walls being respectively removable and immovable, with respect to said opening; whereby said box may be turned upon said axis to selectively present said removable wall in different directions, substantially as set forth.

7. A junction box provided at its end with a screw threaded opening fitted for connection with a conduit and comprising four walls extending parallel with said axis; two of said walls extending at right angles to each other, in immovable relation with each other and with said opening; the other two of said walls extending at right angles and in immovable relation with each other, forming a lid removable with respect to the other walls; and means arranged to detachably secure said lid on said box, substantially as set forth.

8. A junction box comprising a cylindrical inlet and walls, respectively imperforate and provided with outlets, extending transversely to each other, parallel with, and in symmetrical relation to, the axis of said inlet, and arranged to be turned upon said axis to selectively present said outlets in different directions, substantially as set forth.

In testimony whereof, I have hereunto signed my name at Philadelphia, Pennsylvania, this—sixteenth—day of January. 1908.

JAMES F. BURNS.

Witnesses:
W. HAMILTON ROSE,
CLARENCE W. SHICK.